(12) United States Patent
Kondo

(10) Patent No.: US 7,294,255 B2
(45) Date of Patent: Nov. 13, 2007

(54) NITRIFICATION SYSTEM AND METHOD

(75) Inventor: Masao Kondo, Dublin, OH (US)

(73) Assignee: Geyser Pump Tech. Co., Dublin, OH (US)

( * ) Notice: Subject to any disclaimer, the term of this patent is extended or adjusted under 35 U.S.C. 154(b) by 0 days.

(21) Appl. No.: 11/497,764

(22) Filed: Aug. 2, 2006

(65) Prior Publication Data
US 2007/0034558 A1 Feb. 15, 2007

Related U.S. Application Data

(60) Provisional application No. 60/707,859, filed on Aug. 12, 2005.

(51) Int. Cl.
*B01D 3/04* (2006.01)
(52) U.S. Cl. ........................ 210/151; 210/220
(58) Field of Classification Search ................ 210/151, 210/220, 532.1
See application file for complete search history.

(56) References Cited

U.S. PATENT DOCUMENTS 4,676,225 A * 6/1987 Bartera ....................... 126/636

* cited by examiner

*Primary Examiner*—Chester T. Barry
(74) *Attorney, Agent, or Firm*—Tarolli, Sundheim, Covell & Tummino LLP

(57) ABSTRACT

A system reduces ammonia within a fluid flow. The system includes an aeration vessel, a clarifier vessel, and a geyser pump. The aeration vessel nitrifies bacteria within the fluid flow. The aeration vessel has an intake flow rate. The clarifier vessel receives fluid from the aeration vessel. The geyser pump transfers activated sludge from the clarifier vessel to the aeration vessel. The geyser pump transfers activated sludge at a specific flow rate. The specific flow rate is less than 150% of the intake flow rate.

20 Claims, 9 Drawing Sheets

NITRIFICATION SYSTEM AND METHOD

RELATED APPLICATION

This application claims priority from U.S. provisional patent application Ser. No. 60/707,859, filed on Aug. 12, 2005, the subject matter of which is incorporated herein by reference.

TECHNICAL FIELD

The present invention states that the field of the invention is nitrification system, and more particularly, a system for reducing ammonia in a fluid flow.

DESCRIPTION OF THE PRIOR ART

An activated sludge process is typically facilitated by an apparatus for enhancing nitrification. The conventional apparatus comprises the addition of a plurality of submerged, fixed support means to a conventional activated sludge system. These support means act as supports for autotrophic nitrifying bacteria and are utilized in the activated sludge process so that wastewater is substantially free of carbonaceous material by the time the wastewater reaches the support media. A circulation system is used to bring the wastewater into contact with the support media so that efficient nitrification occurs. This circulation system is typically a conventional aeration system.

BACKGROUND OF THE INVENTION

Ammonia is an intermediate compound that results from the decomposition of proteins. It is a common constituent in all domestic wastewater, as mammals eliminate most excess nitrogen via the urinary pathway. This compound is quickly hydrolyzed after leaving the body, which releases ammonia. Ammonia exists as the ammonium ion in wastewater and as the primary reduced form of inorganic nitrogen in natural water.

Pollution control statutes strive to restore and maintain the chemical, physical, and biological integrity of the public water supply. This has been accomplished through the pursuit of two goals. The first is the reduction in pollution of surface water. The second is the prohibition in discharge of toxic compounds in toxic amounts. Ammonia has been found to be toxic to forms of aquatic life at rather low concentrations. As a result, the statutes place significant emphasis on the control of ammonia in wastewater discharge.

A conventional method of wastewater treatment is the activated sludge method. A flow chart for a typical activated sludge treatment process is shown in FIG. 1. FIG. 1 shows the activated sludge process itself, without various procedures that may precede or follow the process. The activated sludge process strives maintaining a biological mass in suspension. The biological mass, or biomass, rapidly absorbs the organic (carbonaceous) material in the wastewater, which is then oxidized and used to accomplish cell growth.

The principal means of reducing the ammonia concentration in the wastewater using an activated sludge process is through the biological oxidation of ammonia to nitrate. The biomass generally contains two types of bacteria, heterotrophs and autotrophs. The heterotrophs absorb carbonaceous material and transform it into energy and cell growth. Heterotrophs have a high rate of growth. Autotrophs absorb ammonia and oxidize it into nitrates. Autotrophs have lower growth rates and cell yield, and are more temperature and pH sensitive than heterotrophs. Heterotrophs and autotrophs both prefer an environment with suitable surface area upon which to grow.

Biomass is mixed with incoming wastewater and is fed into a tank for aeration. Aeration replenishes the oxygen consumed by the activated sludge process and provides mixing to keep the biomass in suspension. In conventional systems, six hours of aeration is provided to accomplish the cell synthesis and the associated oxidation/aging for new growth. This aeration period is necessary to maintain the proper physiological state of the biomass in order to produce good separation of the biomass from the wastewater in a clarification process, resulting in a clear high quality output flow, or effluent.

The typical oxidation of ammonia to nitrate is a sequential, two step, biological process that involves two types of autotrophs. The process is outlined below.

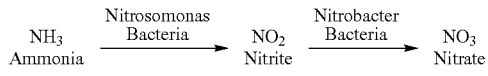

The ammonia is oxidized to nitrite by Nitrosomas bacteria, and then is oxidized to nitrate by Nitrobacter bacteria. These two bacterial groups are autotrophs and use the ammonia as an energy source.

Heterotrophs, which use the carbon-based material as a source of energy, have a relatively high cell yield and undergo relatively rapid growth. In contrast, the autotrophs have a relatively low cell yield and relatively slow growth. The autotrophs are also more temperature and pH sensitive than the heterotrophs. Autotrophs are also strictly aerobic and require the presence of several mg/l of oxygen to achieve optimum activity.

In a conventional activated sludge process, after the aeration treatment of wastewater with biomass, biomass is separated from the flow by gravitational clarification. The net growth of biomass must be removed from the system in order to maintain proper balance between the biomass and incoming organic matter. The remainder of the biomass is returned to the influent end of the aeration process where it is mixed with incoming wastewater.

Many problems exist with the reliability of current nitrification technology in the conventional activated sludge process. If the wastewater flow is high in carbonaceous material, the growth of heterotrophs is so much greater than the growth of the autotrophs that the nitrifying bacteria are overgrown and "washed out" of the activated sludge process. This causes a substantial impairment in the ability of the conventional activated sludge process to successfully achieve reliable nitrification in a one step system.

It has been known to provide submerged media throughout the entire length of the aeration tank to act as biomass support. However these systems suffer from the same overgrowth and "wash-out" problems stated above.

Thus, in plants with a heavy carbonaceous load, nitrification cannot be undertaken effectively as an integral part of a normal activated sludge process. It is often necessary to have a separate nitrification process to treat the wastewater following the removal of the carbonaceous material. These separate nitrifying processes generally consist of a second activated sludge process employing aeration, clarification, and return sludge. Alternatively, a nitrifying filter may employ suitable surface area for the support of a nitrification biomass.

Each of these separate nitrification processes is expensive to construct and operate. A second sludge process is essentially equivalent to an activated sludge process in terms of capital investment, operation, and maintenance costs. In addition, the biomass produced is a weak, poor quality flow resulting in a poor quality effluent following clarification.

Newer nitrifying filters employ plastic media of various shapes as support for the nitrification biomass. These filters are often 20 to 30 feet deep and generally require pumping of the wastewater flow. This type of design is subject to operational problems in cold weather, as the filters are subject to icing. Other forms of fixed media, such as rotating biological contractors, have been employed in an attempt to achieve reliable nitrification. Additionally, natural sloughing of the filters results in poor quality effluent that requires additional treatment before discharge. These disadvantages represent significant capital and operating costs. A flow chart illustrating a conventional secondary nitrification treatment system is illustrated in FIG. 2.

SUMMARY OF THE INVENTION

A system in accordance with the present invention reduces ammonia within a fluid flow. The system includes an aeration vessel, a clarifier vessel, and a geyser pump. The aeration vessel nitrifies ammonia within the fluid flow. The aeration vessel has an intake flow rate. The clarifier vessel receives fluid from the aeration vessel. The geyser pump transfers activated sludge from the clarifier vessel to the aeration vessel. The geyser pump transfers activated sludge at a specific flow rate. The specific flow rate is less than the intake flow rate.

Another system in accordance with the present invention reduces ammonia within a fluid flow. The system includes an aeration vessel, a clarifier vessel, and a pump. The aeration vessel nitrifies bacteria within the fluid flow. The clarifier vessel receives fluid from the aeration vessel. The clarifier vessel has a plurality of lattice structures for increasing resistance of the fluid flow through the clarifier vessel. The plurality of lattice structures thereby enhances nitrification. The pump intermittently transfers activated sludge from the clarifier vessel to the aeration vessel.

Still another system in accordance with the present invention reduces ammonia within a fluid flow. The system includes an aeration vessel, a clarifier vessel, and a geyser pump. The aeration vessel nitrifies ammonia within the fluid flow. The aeration vessel has an intake flow rate. The clarifier vessel receives fluid from the aeration vessel. The clarifier vessel has a plurality of lattice structures for increasing resistance of the fluid flow through the clarifier vessel. The plurality of lattice structures thereby enhances nitrification. The geyser pump transfers activated sludge from the clarifier vessel to the aeration vessel. The geyser pump transfers activated sludge at a specific flow rate. The specific flow rate is less than 150% of the intake flow rate.

BRIEF DESCRIPTION OF THE DRAWINGS

The foregoing and other features of the present invention will become apparent to those skilled in the art to which the present invention relates upon reading the following description with reference to the accompanying drawings, in which.

DESCRIPTION OF PREFERRED EMBODIMENT

Conventional methods of reducing ammonia levels in sewage include biological treatment, chemical treatment using an ammonia stripping method, an ion exchange method, and/or chlorine dosing. Among these, biological treatment is most widely utilized due to its efficiency, economy, and easy maintenance.

The biological conversion of ammonia to nitrate, or nitrification, is described above, and as follows: ammonia is converted to nitrite (as typified by *Nitrosomonas*) by $NH_4^+$ $3/2O_2 \rightarrow NO_2^- + H_2O \rightarrow 2H^+$ and then nitrite to nitrate (by *Nitrobacter*) by $NO_2^- + 1/2O_2 \rightarrow NO_3^-$. Nitrifying bacteria (like *Nitrosomonas* and *Nitrobacter*) are sensitive organisms and extremely susceptible to a wide variety of inhibitors. From both laboratory studies and the operation of full-scale plants, the following factors have been determined to affect a nitrification process: 1) concentration of ammonia and nitrite; 2) BOD/TKN ratio; 3) dissolved oxygen concentration; 4) temperature; and 5) pH. A variety of organic and inorganic agents may inhibit the growth and action of these organisms. For example, high concentrations of ammonia and nitrous acid may be inhibitory.

Figure 3:
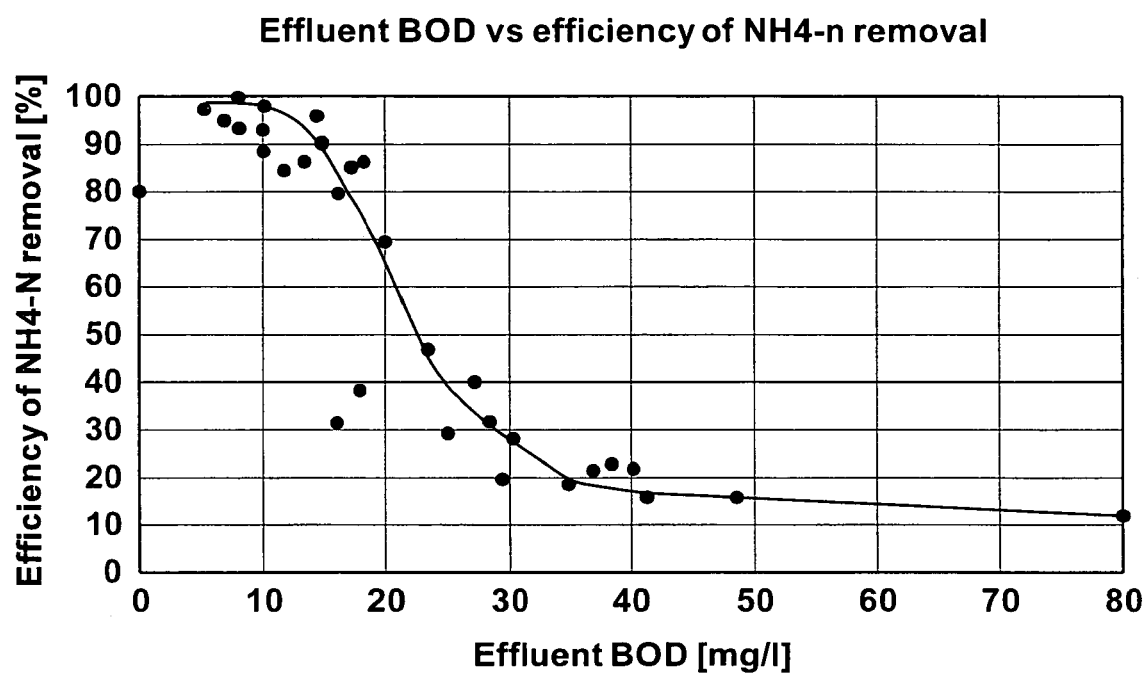
FIG. 3 is a schematic representation of an example performance of an activated sludge process.

If there remains a specific concentration of biochemical oxygen demand (BOD) in the water of the sewage treatment plant, nitrifying bacteria may not be dominant in competition with BOD-removal bacteria. FIG. 3 shows an example effect of remaining BOD to $NH_4$—N removal efficiency. If BOD is reduced to less than 20 mg/l, nitrification may be enhanced. On the other hand, if BOD is more than 40 mg/l, nitrification may be minimal.

Figure 5:
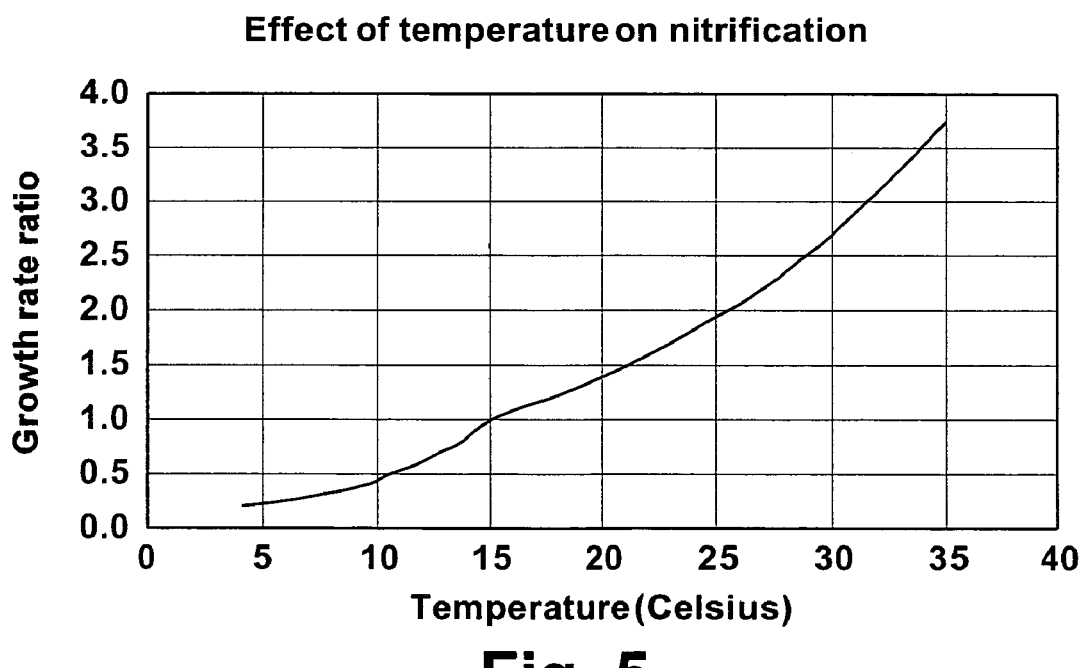
FIG. 5 is a schematic representation of still another example performance of an activated sludge process.

FIG. 5 shows an example effect of dissolved oxygen (DO) on nitrification efficiency. DO concentrations above 1 mg/l may be essential for nitrification to occur. If DO levels drop below 1 mg/l, oxygen becomes a limiting nutrient and nitrification slows or ceases.

Temperature may have a significant effect on nitrification rate. The overall nitrification rate $\mu_n(t)$ at a certain temperature t may decrease with decreasing temperature and may be accounted for with the following relationship: $\mu(t)=\mu''(15) \ominus^{t-15}$ where $\mu(15)$, $\ominus$, and t are a growth rate of nitrifying bacteria at 15 degrees Celsius, a nitrification rate constant, and the temperature, respectively.

Figure 4:
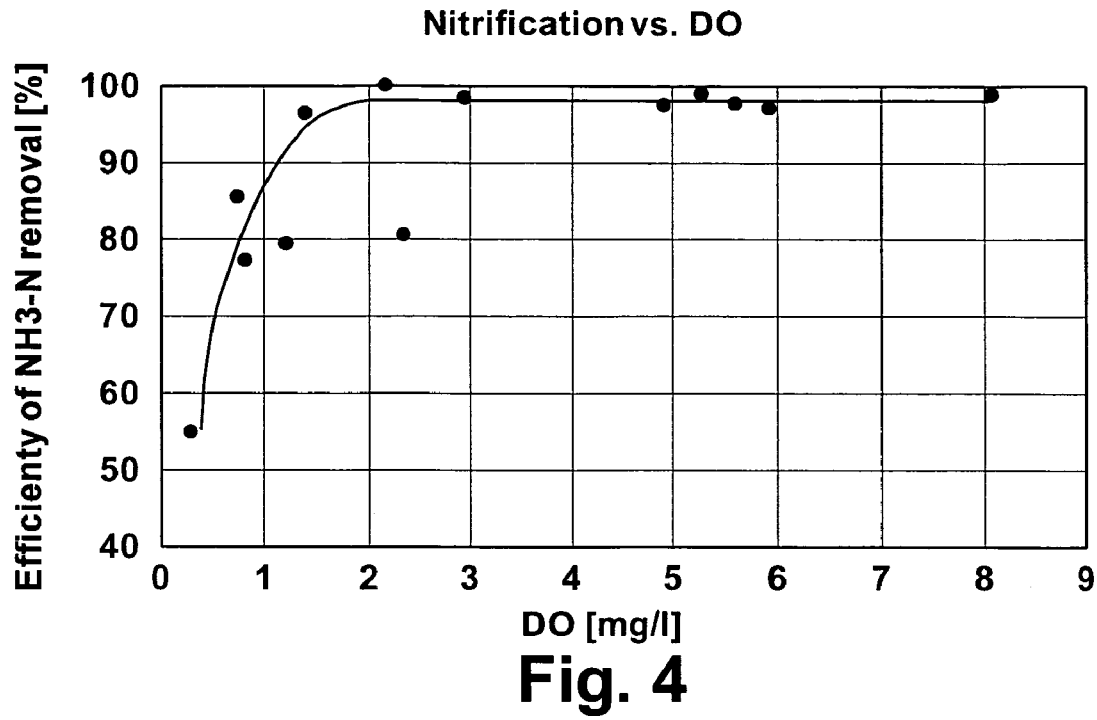
FIG. 4 is a schematic representation of another example performance of an activated sludge process.
Figure 6:
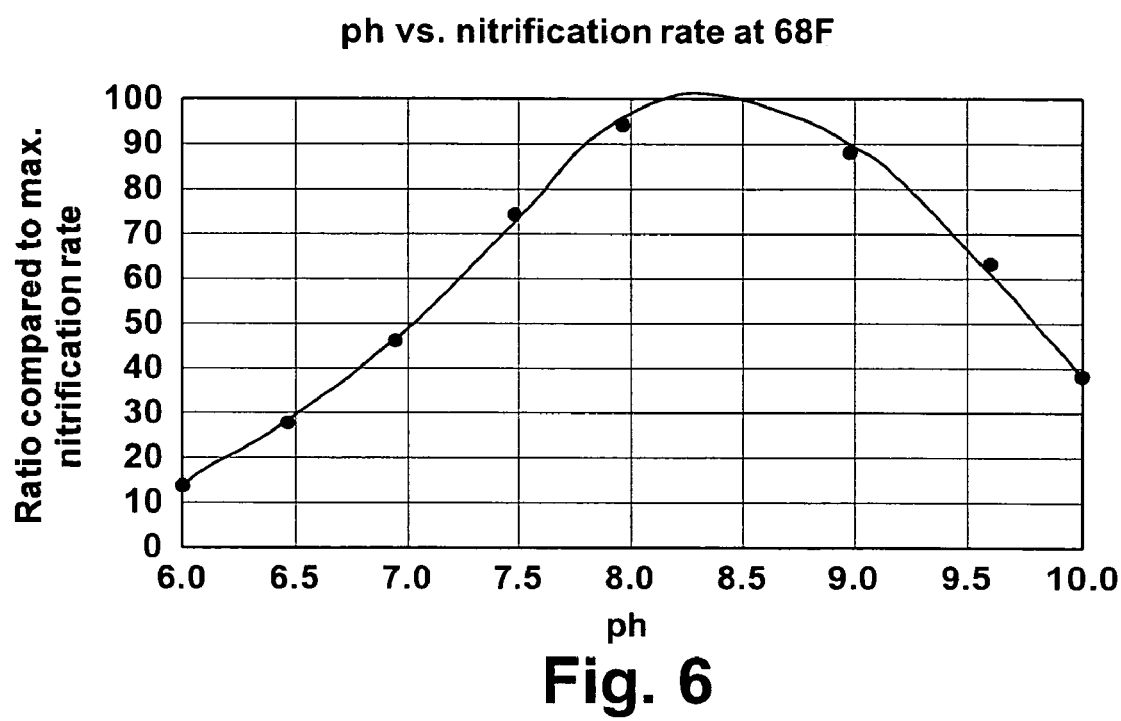
FIG. 6 is a schematic representation of yet another example performance of an activated sludge process.

FIG. 6 shows an example effect of temperature on the growth rate of nitrifying bacteria. The growth rate ratio may be the value of $\mu_n(t)/\mu_n(15)$. As shown in FIG. 6, the optimum temperature may be approximately 35 degrees. To maintain high efficiency of nitrification, temperature may typically be maintained above 15 degrees in this example. A maximum rate of nitrification may occur between pH values of about 7.2 and 9.0. FIG. 4 shows an example effect of pH on nitrification.

A system in accordance with the present invention may enhance nitrification (ammonia reduction) in wastewater treatment plants. Typically, an airlift pump (FIG. 7) is installed for Return Activated Sludge (RAS) in a clarifier of a wastewater treatment plant. RAS is a thickened concentration of microorganisms in the clarifier. The airlift pump returns RAS to the aeration tank. In this way, a wastewater treatment system may maintain a suitable concentration of the microorganisms in the clarifier.

An airlift pump may create much agitation in the clarifier. Nitrifying bacteria may be a fluffy microorganism. Because of the agitation in the clarifier, this microorganism may not remain in the clarifier, but be carried away by the flow of water. Therefore, the system may no longer have an amount of nitrifying bacteria that is adequate for nitrification.

Typically, blowers are connected to diffusers in the aeration tank and airlift pumps are utilized to transfer RAS back to the aeration tank. An airlift pump may consume much air from an air supply, or air source. Therefore, the air available to the aeration tank from the air supply may not be adequate and dissolved oxygen (DO) may be less than 1 mg/l.

Figure 7:
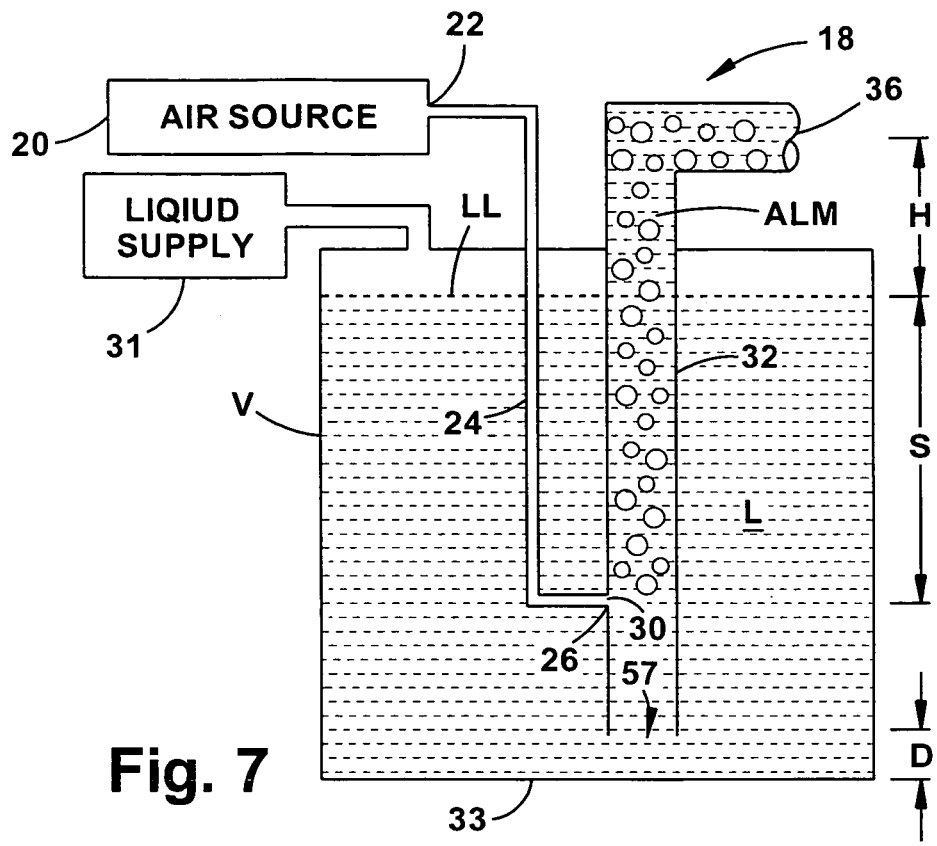
FIG. 7 is a schematic representation of an airlift pump system.

A conventional airlift pump apparatus 18 is shown FIG. 7. Air is supplied from a compressed air source 20 connected to an input end 22 of an air supply line 24. An output end 26 is connected to a port 30 to a lower end of a riser tube 32. Port 30 is submerged below liquid level LL to a depth S in the liquid L being pumped. The lower intake port 57 of the riser tube 32 is maintained at a distance D above a bottom wall 33 of vessel V. Air flowing through the liquid L in the portion of the riser tube 32 above the port 30 creates an air-liquid mix ALM which is less dense than the liquid L. The ALM thus tends to rise and is discharged through an output port 36. Liquid L is transferred from a liquid supply 31 to the vessel V holding the liquid L. The flow of air through the air supply line 24 and the port 30 remains constant. Thus, using the conventional airlift pump apparatus 18, the air-liquid mix ALM lifted by the head distance H and discharged through the output port 36 is continuous, provided liquid level LL does not fall below port 30.

However, when a geyser pump (FIGS. 8-15) is installed instead of an airlift pump, agitation in the clarifier may be minimal. Thus, nitrifying bacteria may settle to the bottom of the clarifier and be returned to the aeration tank by the geyser pump. The amount of nitrifying bacteria in the aeration tank is thereby maintained for proper nitrification. Since a geyser pump does not consume much air, DO in the aeration tank may also be increased to more than 2 mg/l.

For these two reasons, ammonia concentration output by the clarifier may be reduced. In tests, before the installation of a geyser pump, effluent ammonia concentration was more than 20 mg/l. After exchanging an airlift pump with a geyser pump, effluent ammonia concentration was reduced to less than 1 mg/l.

Figure 1:
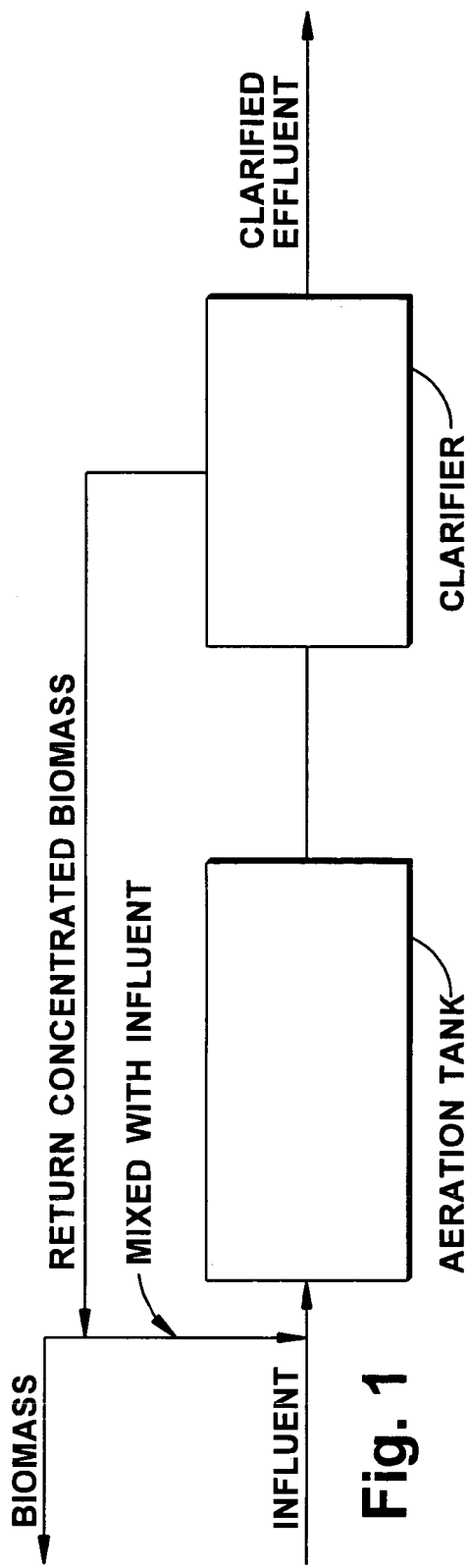
FIG. 1 is a schematic representation of a conventional activated sludge process.
Figure 2:
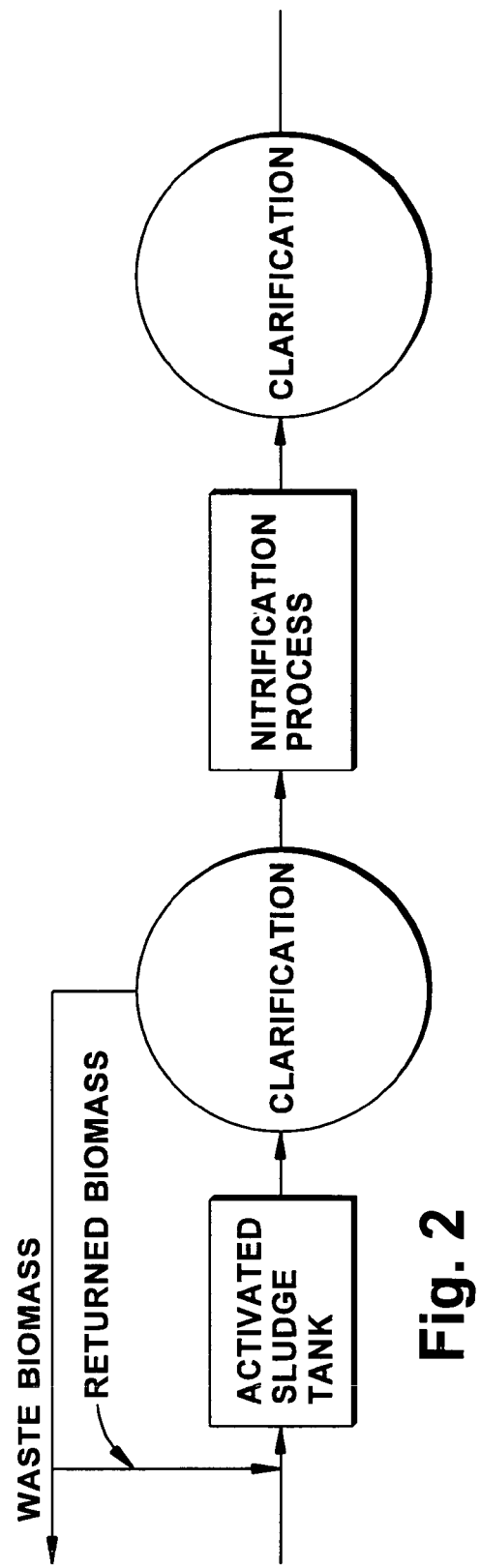
FIG. 2 is a schematic representation of a conventional activated sludge process with a separate nitrification component.

Example geyser pumps for use with the present invention are described below. The vessel V of FIG. 1 may be part of a septic tank and the liquid supply 31 may be a supply of wastewater liquid L contained in another portion of the same septic tank. However, liquid supply 31 may be any suitable liquid supply, such as but not limited to, a river or precipitation, and vessel V may be any reservoir for holding liquid, such as but not limited to, a natural body of water, lake, or ocean. Liquid supply 31 and vessel V may also together comprise a single source of liquid.

Figure 8:
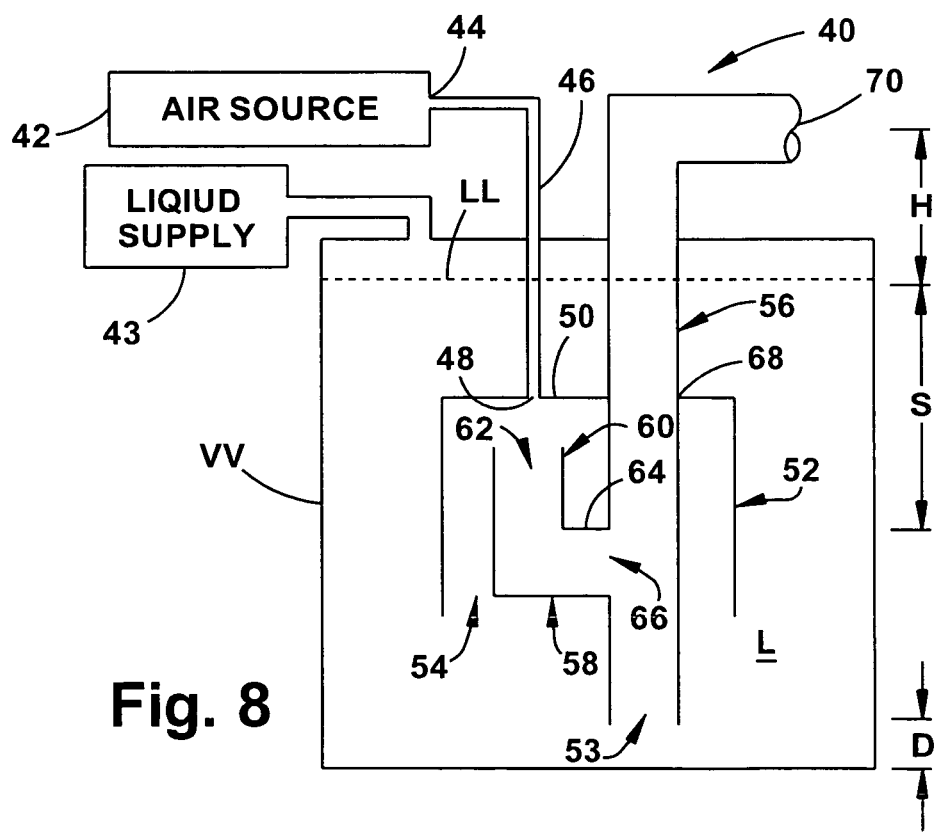
FIG. 8 is a schematic representation of a part of a geyser pump system in accordance with one example embodiment of the present invention.
Figure 9:
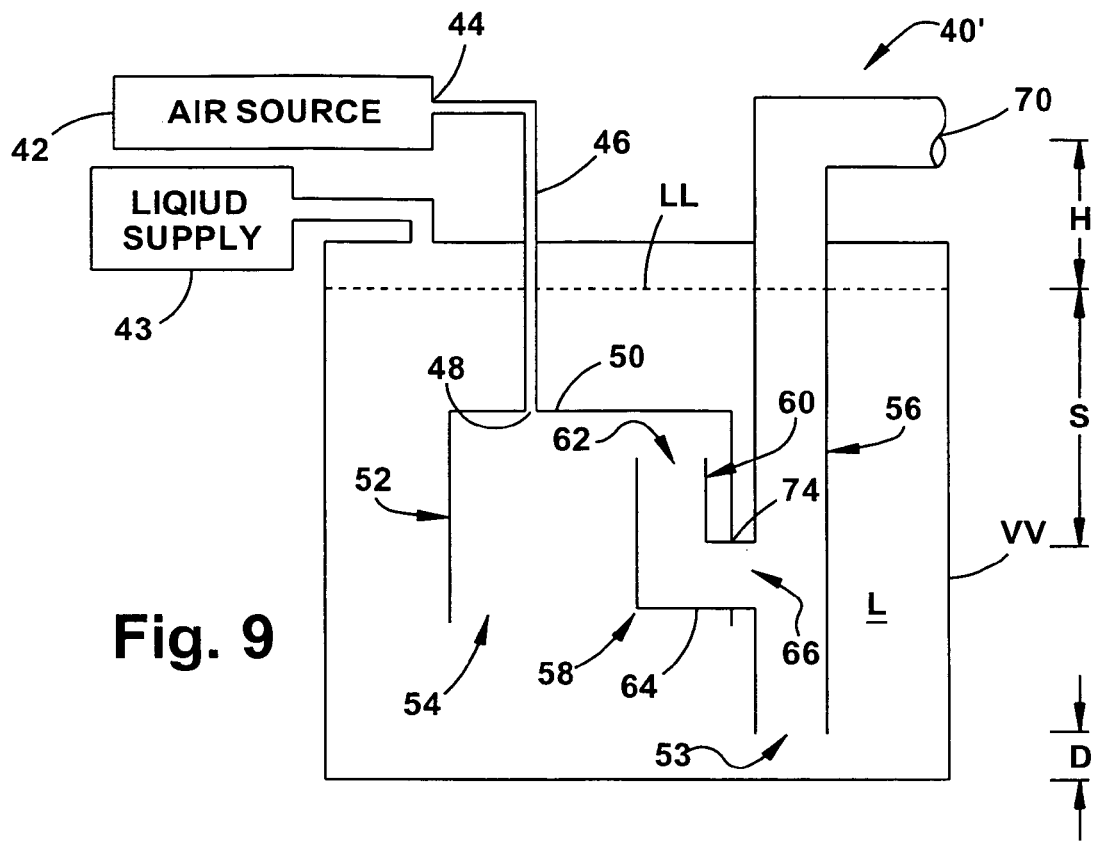
FIG. 9 is a schematic representation of a part of a geyser pump system in accordance with another example embodiment of the present invention.

FIG. 8 shows a schematic representation of a first example geyser pump for use with the present invention. FIG. 9 shows a schematic representation of a second example geyser pump for use with the present invention. FIGS. 8 and 9 both represent a geyser pump characterized by intermittent pumping of liquid. The liquid L and air-liquid mix ALM seen in FIG. 7 are not shown in FIGS. 8 and 9 for clarity.

FIG. 8 shows a modified airlift pump system, or example geyser pump system 40, in which air is supplied from an air source 42 connected to an input port 44 of an air supply line 46. An output port 48 of the air supply line 46 is connected to an upper closed end 50 of an air tank 52. The air tank 52 is illustrated as being of cylindrical construction with a bottom open end 54 adjacent the liquid L.

A cylindrical riser tube 56 is formed with a connected elbow 58 having an upper vertical intake end 60 with an intake port 62 and a lower horizontal discharge end 64 with a discharge port 66 connected to a lower intermediate portion of the riser tube 56. An upper portion of the riser tube 56 penetrates and forms a relatively tight opening 68 in the upper closed end 50 of the air tank 52. The air tank 52 and the riser tube 56 are located in a suitable septic tank or other vessel VV connected to a liquid supply 43. The vessel VV may contain wastewater liquid L to be pumped through intake port 53 of the riser tube 56 in a manner described below for discharge through the output port 70 of the riser tube 56. Distances H, S and D may represent dimensions corresponding to dimensions of FIG. 7.

FIG. 9 shows another example geyser pump apparatus 40' utilizing many components similar to the geyser pump apparatus 40. Similar components are identified in FIG. 9 by the same numerals and letter notation as used in FIG. 8.

In FIG. 9, the riser tube 56 is mounted externally of the air tank 52 and has a lower horizontal discharge end 64 of the connected elbow 58 mounted through a relatively tight side wall opening 74 in the air tank 52.

Geyser pumps may be formed in many different ways and sizes with each such form being capable of intermittent pumping of liquid. An example air tank 52 may be formed of plastic tubing of approximately 4 inches internal diameter. An example riser tube 56 and example connected elbow 58 may be formed of plastic tube of approximately 1 inch internal diameter. An example relative height of the air tank 52 and relative length of the riser tube 56 may be as generally sown in FIGS. 8 or 9.

FIGS. 10-14 describe an exemplary manner of operation for the geyser pump apparatus 40' of FIG. 9. Liquid L may be wastewater being pumped from a septic tank VV, to a drain field (not shown).

Figure 10:
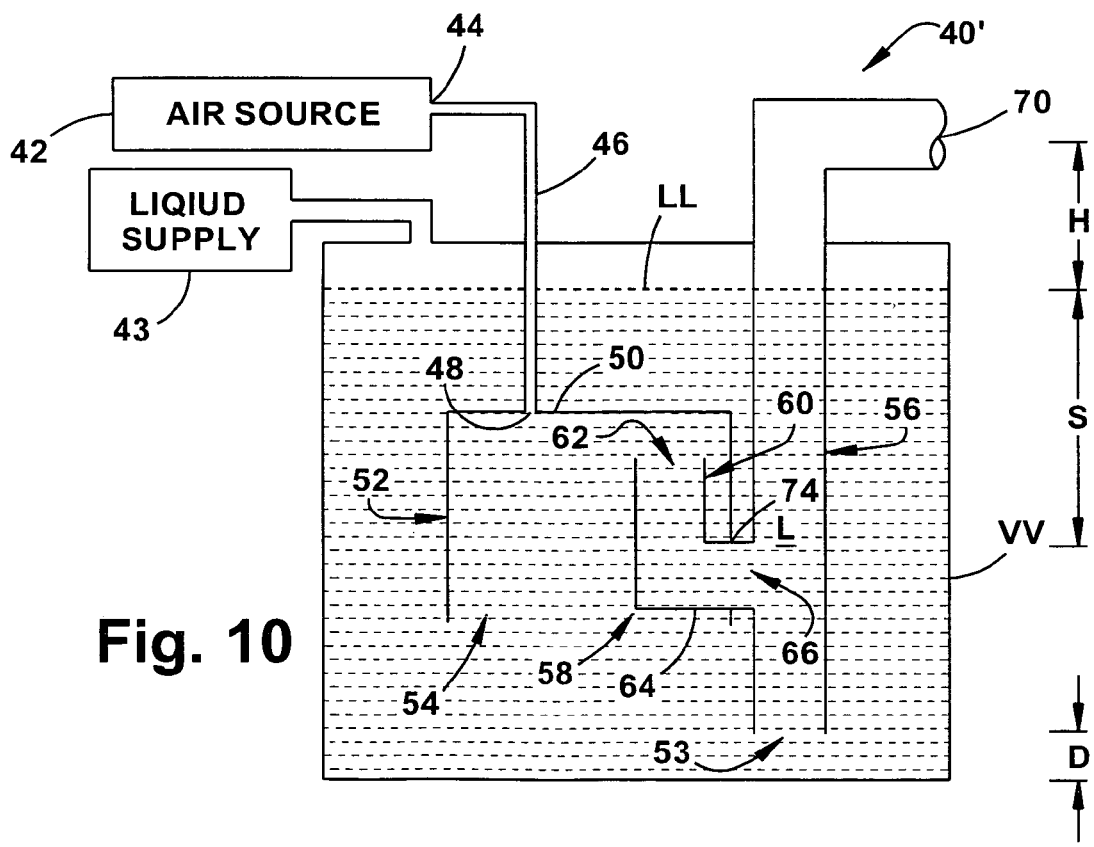
FIG. 10 is a schematic representation of an example operation of the geyser pump system of FIG. 9.

At the beginning of a cycle of operation, FIG. 10 illustrates the geyser pump apparatus 40' with the air tank 52, the connected elbow 58, the upper vertical end 60, and the lower horizontal discharge end 64 all filled with the liquid L and with little or no air present in the air tank 52.

Figure 11:
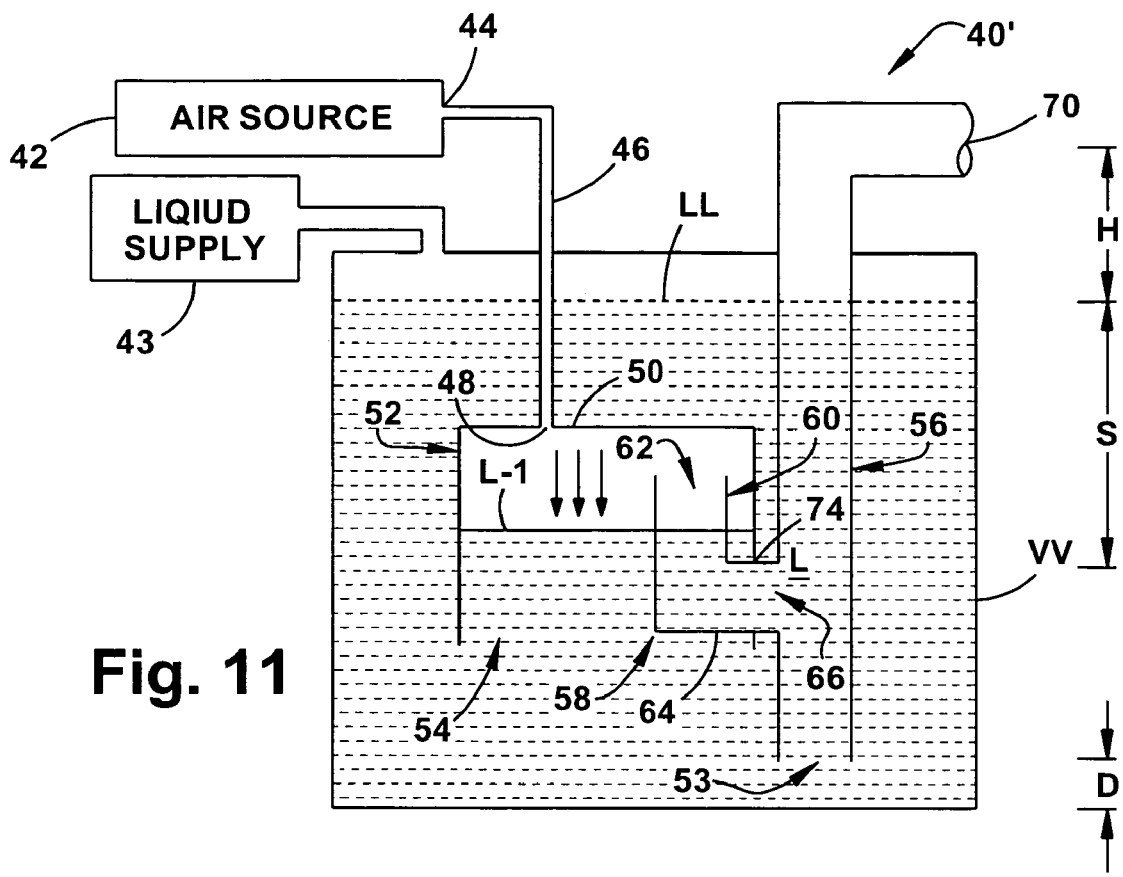
FIG. 11 is a schematic representation of another example operation of the geyser pump system of FIG. 9.

FIG. 11 shows the effect of admitting and storing air in the air tank 52 and forcing the liquid L through the air tank 52 to move to a level L-1. At the level L-1, the example geyser pump apparatus 40' is not discharging liquid through the output port 70.

Figure 12:
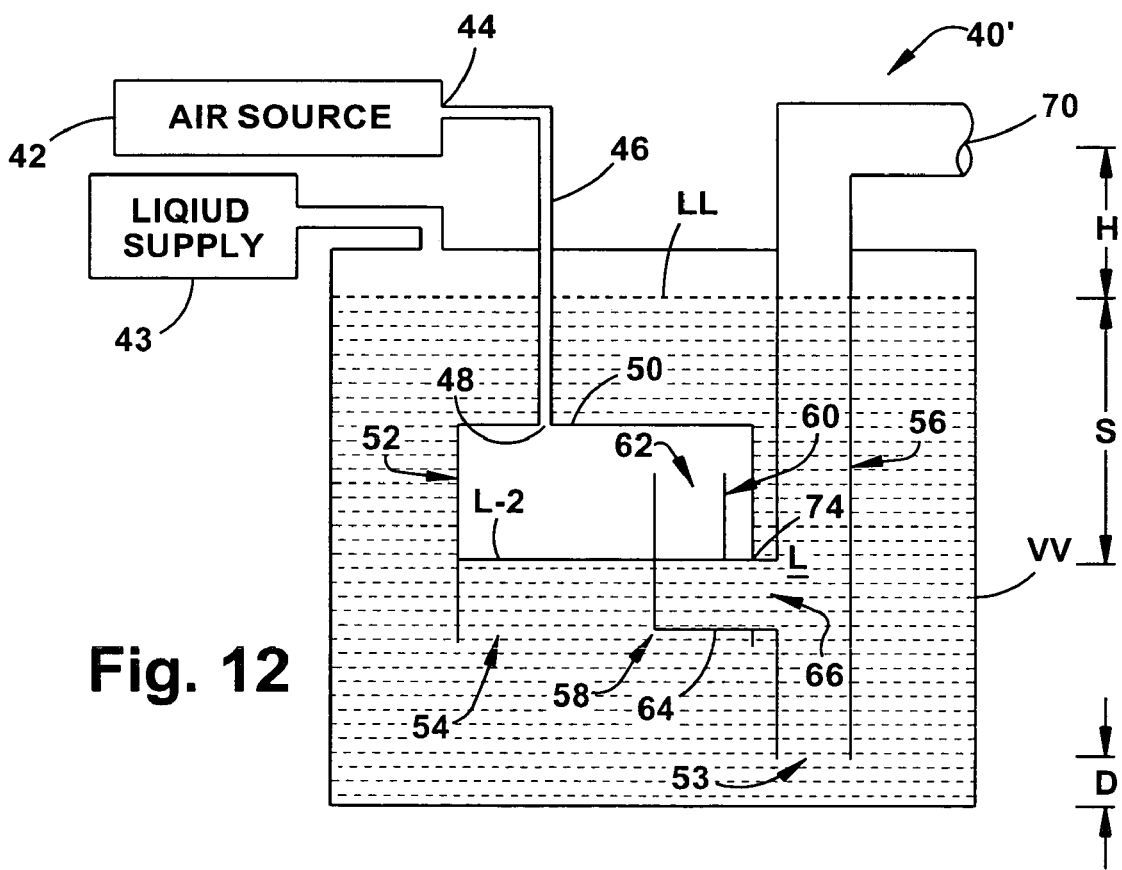
FIG. 12 is a schematic representation of still another example operation of the geyser pump system of FIG. 9.

FIG. 12 shows a more advanced stage with the air emitted into the air tank 52 causing the liquid L within the air tank to reach a lower level L-2 at which the air in the air tank is shown in FIG. 12 just prior discharging through the discharge end 64 of the connected elbow 58. At the level L-2, the geyser pump apparatus 40' is not yet discharging the liquid L through the output port 70.

Figure 13:
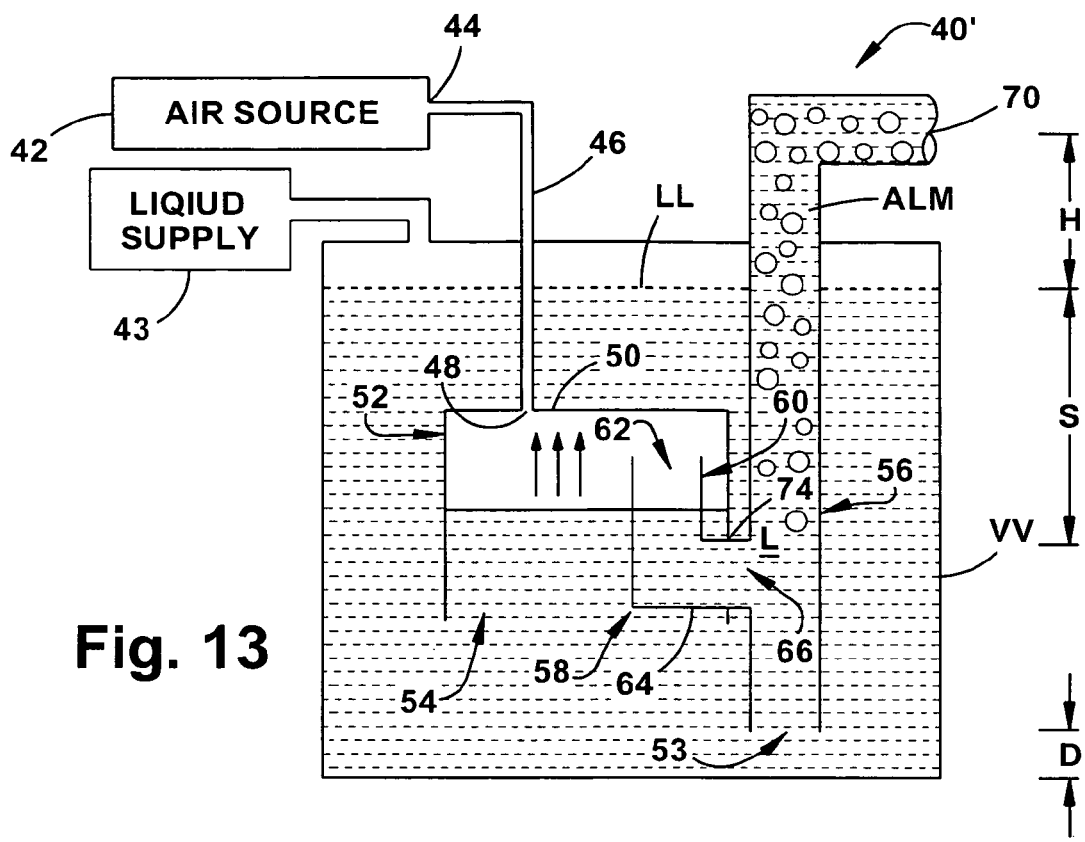
FIG. 13 is a schematic representation of yet another example operation of the geyser pump system of FIG. 9.

FIG. 13 shows the stored pressurized air from the air tank 52 being into the riser tube 56 along with such liquid as was stored in the discharge end 64 of the connected elbow 58 thus forming the air-liquid mix ALM. As stated above the ALM, having a reduced density, rises and liquid L is drawn through the intake port 53 and is pumped through the output port 70 for discharge to a drain field or other location (not shown).

Figure 14:
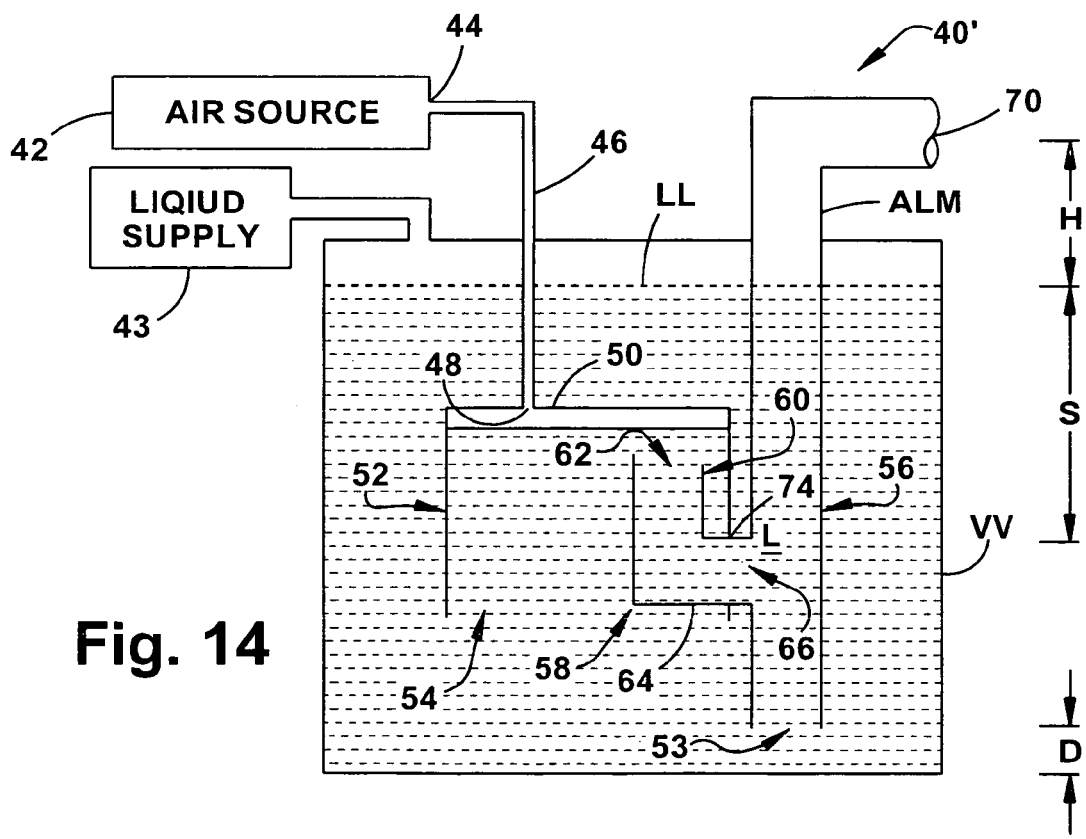
FIG. 14 is a schematic representation of still another example operation of the geyser pump system of FIG. 9.

The amount of air-liquid mix ALM contained in each intermittent discharge burst of a geyser pump apparatus 40 or 40' may be significantly larger and more powerful than the air-liquid mix ALM output of a typical airlift apparatus (FIG. 7). Further, such a discharge burst may dislodge bioorganisms from an inside surface of the riser tube 56 and the output port 70, as well from an inside surface of any pipe, drain field tile, or the like connected directly to the output port 70. Clogging of a septic tank system may thereby be prevented or mitigated. FIG. 13 also shows the liquid L having partially refilled the air tank 52. FIG. 14 shows an end of a pumping cycle as preparation for a new cycle.

The air source 42 may be a continuously feed of air through the air supply line 46. The air source 42 may be compressed air, a fan-type air, or any other suitable source. The liquid L may be fed from an appropriate liquid supply 43 to a septic tank or vessel VV intermittently, as is common with both household and commercial septic tank systems and with other conventional liquid collection and transfer systems.

Figure 15:
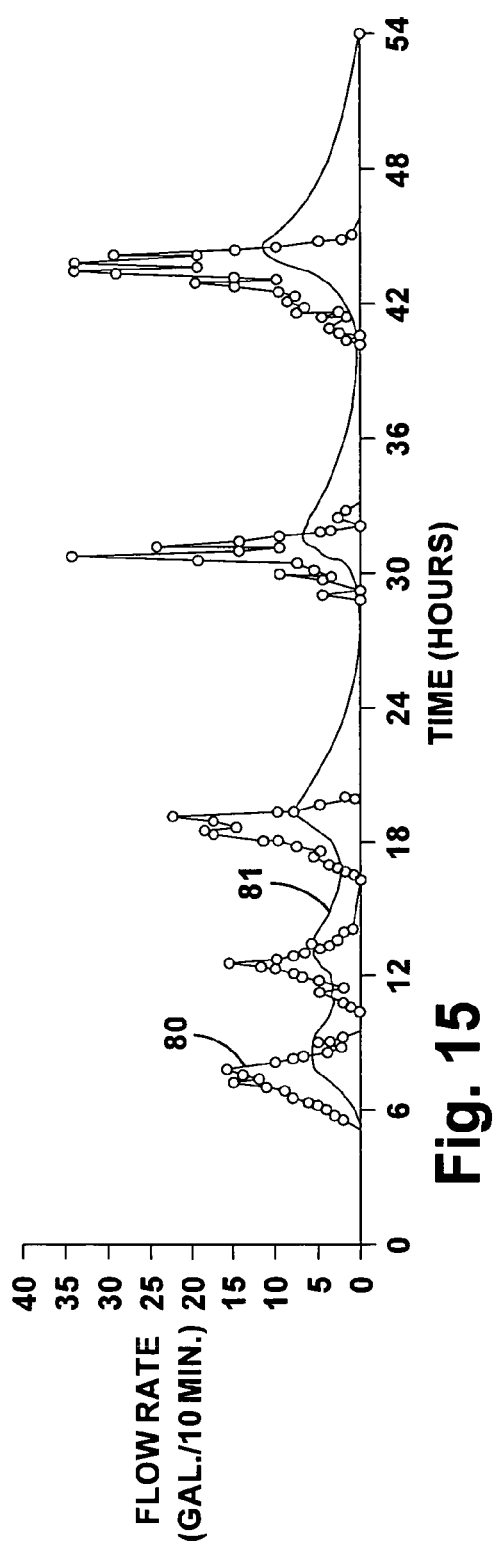
FIG. 15 is a schematic representation of example operation of part of an activated sludge process.

FIG. 15 shows an example inflow to a septic tank or vessel VV varying, as indicated by example curve 80. The intermittent discharge from the vessel VV may be more constant, as indicated by curve 81. A geyser pump apparatus 40 or 40' in accordance with the present invention may prevent a septic tank system from producing a 1:1 ratio of liquid input to liquid output. Thus, input wastewater may reside in vessel VV for some amount of time prior to being discharged through the output port 70.

Residence time of the wastewater in vessel VV thereby allows more thorough digestion and treatment of the wastewater while within the vessel prior to going into a drain field. Also, a substantially equal output flow over time may be achieved, as shown by curve 81 of FIG. 15.

Variations in the head distance H, submerged distance S, and intake distance D may affect the manner in which a geyser pump operates. However, so long as a supply of liquid L is available to intermittently fill and replenish the air tank 52, numerous advantages of a system in accordance with the present invention are achieved. Liquid may be pumped intermittently, aerated, and pumped to a drain field intermittently thereby enhance absorption of the liquid by soil.

With the intermittent mode of operation, less energy may be required to operate an airlift system in accordance with the present invention than with a prior art airlift system, such as FIG. 7. If the system of FIG. 7 and the system of FIGS. 8 or 9 have the same pressurized air source and the same dimensions H, S and D, the systems of FIGS. 8 or 9 output at a rate greater than the system of FIG. 7.

For example, when S=610 mm, H=260 mm, and airflow equals approximately 5.60 liters/minute, the system of FIGS. 8 or 9 may have a liquid flow rate of 5.36 liters/minute and an efficiency of 40.7%. In significant contrast, under the same conditions, the system of FIG. 7 may have a liquid flow rate of 2.90 liters/minute and an efficiency of 22.1%.

Figure 16:
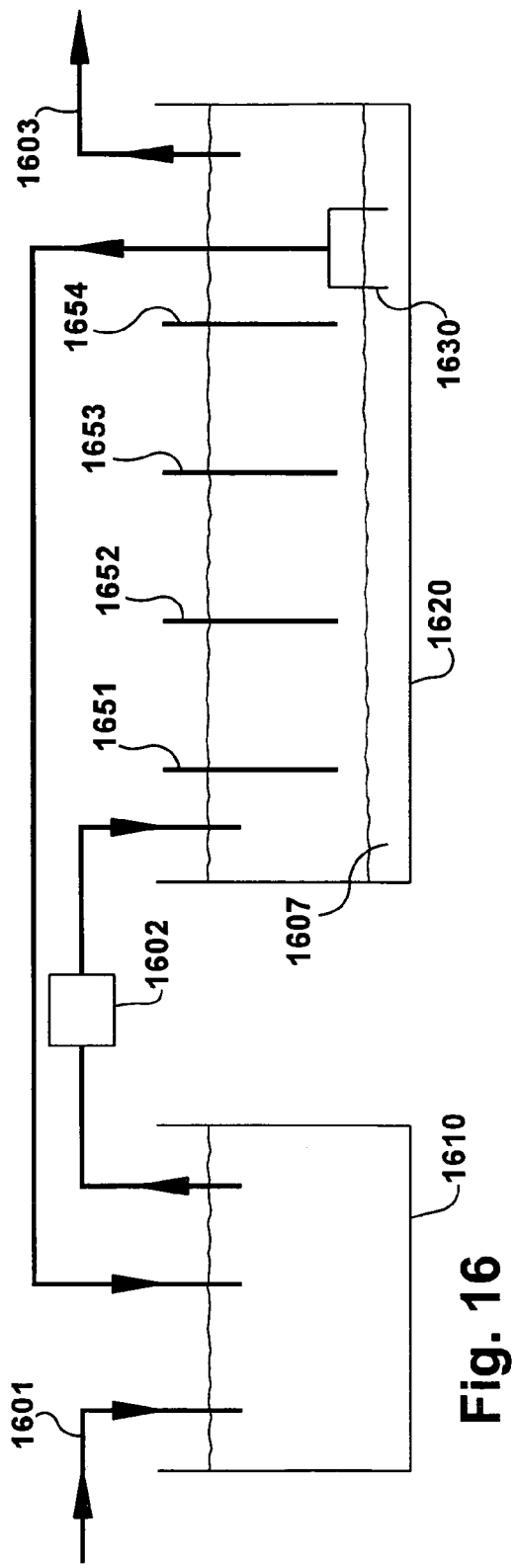
FIG. 16 is a schematic representation of another example embodiment of a system in accordance with the present invention.

FIG. 16 shows an example of an activated sludge system 1600 in accordance with another aspect of the present invention. The system 1600 includes an aeration tank 1610, a clarifier tank 1620, and a geyser pump 1630. The aeration tank 1610 receives an inflow 1601 of wastewater. A pump 1602, which may or may not be a geyser pump, transfers biomass and water to the clarifier tank 1620. An outflow 1603 removes clarified and treated water from the clarifier tank 1620. A geyser pump 1630 removes activated sludge 1607 from the clarifier tank 1620 and transfers the activated sludge back to the aeration tank 1610. As stated above, the intermittent nature of the geyser pump 1630 allows the activated sludge 1607 to settle in the clarifier tank 1620 and not be carried away by the outflow 1603.

Another feature of this system 160 may be a plurality of lattice structures 1651-1654 within the clarifier tank 1620 for increasing resistance of the clarified water and activated sludge 1607 out of the clarifier tank by the outflow 1603, thereby facilitating and enhancing nitrification by the activated sludge 1607 returned to the aeration tank 1610. Each lattice structure 1651-1654 may, for example, have one-inch square openings allowing flow of water through the lattice structures, but facilitating settling out of activated sludge 1607 to the bottom of the clarifier tank 1620.

It will be understood that the above description of the present invention is susceptible to various modifications, changes and adaptations, and the same are intended to be comprehended within the meaning and range of equivalents of the appended claims. The presently disclosed example embodiments are considered in all respects to be illustrative, and not restrictive. The scope of the invention is indicated by the appended claims, rather than the foregoing description, and all changes that come within the meaning and range of equivalence thereof are intended to be embraced therein.

Having described the invention, the following is claimed:

1. A system for reducing ammonia within a fluid flow, said system comprising:
    an aeration vessel for nitrifying bacteria within the fluid flow, said aeration vessel having an intake flow rate;
    a clarifier vessel for receiving fluid from said aeration vessel; and
    a geyser pump for transferring activated sludge from said clarifier vessel to said aeration vessel, said geyser pump transferring activated sludge at a specific flow rate, said specific flow rate being less than said intake flow rate.

2. The system as set forth in claim 1 wherein said geyser pump provides intermittent pumping of activated sludge from said clarifier vessel to said aeration vessel.

3. The system as set forth in claim 1 wherein said geyser pump transfers an air-liquid mixture from said clarifier vessel to said aeration vessel.

4. The system as set forth in claim 1 wherein said geyser pump intermittently transfers an air-liquid mixture from said clarifier vessel to said aeration vessel.

5. The system as set forth in claim 1 wherein said geyser pump provides an intermittent discharge burst of activated sludge from said clarifier vessel to said aeration vessel.

6. The system as set forth in claim 1 wherein said geyser pump transfers an air-liquid mixture from said clarifier vessel to said aeration vessel.

7. The system as set forth in claim 1 wherein said geyser pump provides a discharge burst for dislodging bioorganisms from an inner surface said geyser pump.

8. The system as set forth in claim 1 wherein said geyser pump is powered by a continuous air feed that builds up a charge of air and discharges the charge along with activated sludge to said aeration vessel.

9. The system as set forth in claim 1 wherein said geyser pump stores pressurized air and intermittently discharges the stored pressurized air to said aeration vessel.

10. The system as set forth in claim 1 wherein said geyser pump provides an intermittent transfer of activated sludge such that nitrifying bacteria may settle to a bottom of said clarifier vessel.

11. A system for reducing ammonia within a fluid flow, said system comprising:
   an aeration vessel for nitrifying bacteria within the fluid flow;
   a clarifier vessel for receiving fluid from said aeration vessel, said clarifier vessel having a plurality of lattice structures for increasing resistance of the fluid flow through said clarifier vessel, said plurality of lattice structures thereby enhancing nitrification; and
   a pump for intermittently transferring activated sludge from said clarifier vessel to said aeration vessel.

12. The system as set forth in claim 11 wherein said pump transfers an air-liquid mixture from said clarifier vessel to said aeration vessel.

13. The system as set forth in claim 11 wherein said pump provides a discharge burst for dislodging bioorganisms from an inner surface of said pump.

14. The system as set forth in claim 11 wherein said pump is powered by a continuous air feed that builds up a charge of air and discharges the charge along with activated sludge to said aeration vessel.

15. The system as set forth in claim 11 wherein said pump stores pressurized air and intermittently discharges the stored pressurized air to said aeration vessel thereby providing an intermittent transfer of activated sludge such that nitrifying bacteria may settle to a bottom of said clarifier vessel.

16. A system for reducing ammonia within a fluid flow, said system comprising:
   an aeration vessel for nitrifying bacteria within the fluid flow, said aeration vessel having an intake flow rate;
   a clarifier vessel for receiving fluid from said aeration vessel, said clarifier vessel having a plurality of lattice structures for increasing resistance of the fluid flow through said clarifier vessel, said plurality of lattice structures thereby enhancing nitrification; and
   a geyser pump for transferring activated sludge from said clarifier vessel to said aeration vessel, said geyser pump transferring activated sludge at a specific flow rate, said specific flow rate being less than said intake flow rate.

17. The system as set forth in claim 16 further including a pump for transferring biomass and water from said aeration vessel said clarifier vessel.

18. The system as set forth ion claim 16 said plurality of lattice structures have openings for allowing flow of water through said lattice structures, but facilitating settling out of activated sludge to a bottom of said clarifier vessel.

19. The system as et forth in claim 16 wherein said geyser pump provides a discharge burst for dislodging bioorganisms from an inner surface of said geyser pump.

20. The system as set forth in claim 16 wherein said geyser pump is powered by a continuous air feed that builds up a charge of air and discharges the charge along with activated sludge to said aeration vessel.

* * * * *